United States Patent
Jung

(10) Patent No.: US 11,378,428 B2
(45) Date of Patent: Jul. 5, 2022

(54) METHOD AND DEVICE FOR SPLITTING COMPOSITE SIGNAL RECEIVED FROM MULTI-COMPOSITE SENSOR

(71) Applicant: WELIX Co., Ltd., Anyang-si (KR)

(72) Inventor: ki won Jung, Seosan-si (KR)

(73) Assignee: WELIX Co., Ltd., Anyang-si (KR)

( * ) Notice: Subject to any disclaimer, the term of this patent is extended or adjusted under 35 U.S.C. 154(b) by 0 days.

(21) Appl. No.: 17/330,457

(22) Filed: May 26, 2021

(65) Prior Publication Data

US 2022/0128387 A1 Apr. 28, 2022

(30) Foreign Application Priority Data

Oct. 26, 2020 (KR) .................. 10-2020-0138958

(51) Int. Cl.
*G01D 21/02* (2006.01)
*G16Y 40/20* (2020.01)

(52) U.S. Cl.
CPC .............. *G01D 21/02* (2013.01); *G16Y 40/20* (2020.01)

(58) Field of Classification Search
CPC ............................ G01D 21/02; G16Y 40/20
See application file for complete search history.

(56) References Cited

U.S. PATENT DOCUMENTS

| | | | | | |
|---|---|---|---|---|---|
| 5,956,663 | A | * | 9/1999 | Eryurek | ........... G08C 19/02 702/183 |
| 2016/0071526 | A1 | * | 3/2016 | Wingate | ........... G01S 3/802 704/233 |

FOREIGN PATENT DOCUMENTS

| KR | 10-1202614 B1 | 11/2012 |
|---|---|---|
| KR | 101902958 B1 * | 10/2018 |
| KR | 10-2019-0003597 A | 1/2019 |

* cited by examiner

*Primary Examiner* — Yoshihisa Ishizuka
(74) *Attorney, Agent, or Firm* — Revolution IP, PLLC

(57) ABSTRACT

The present invention relates to a method and a device for splitting a composite signal received from a multi-composite sensor, and more particularly, to a method and a device for splitting a composite signal received from a multi-composite sensor in which a composite signal, in which various detection signals for a temperature, humidity, gas leakage, fire, smoke, and an organic gas are mixed and integrated into one signal, is split into each individual detection signal and recognized.

10 Claims, 10 Drawing Sheets

Device for separating composite signal
received from multi-composite sensor(100)

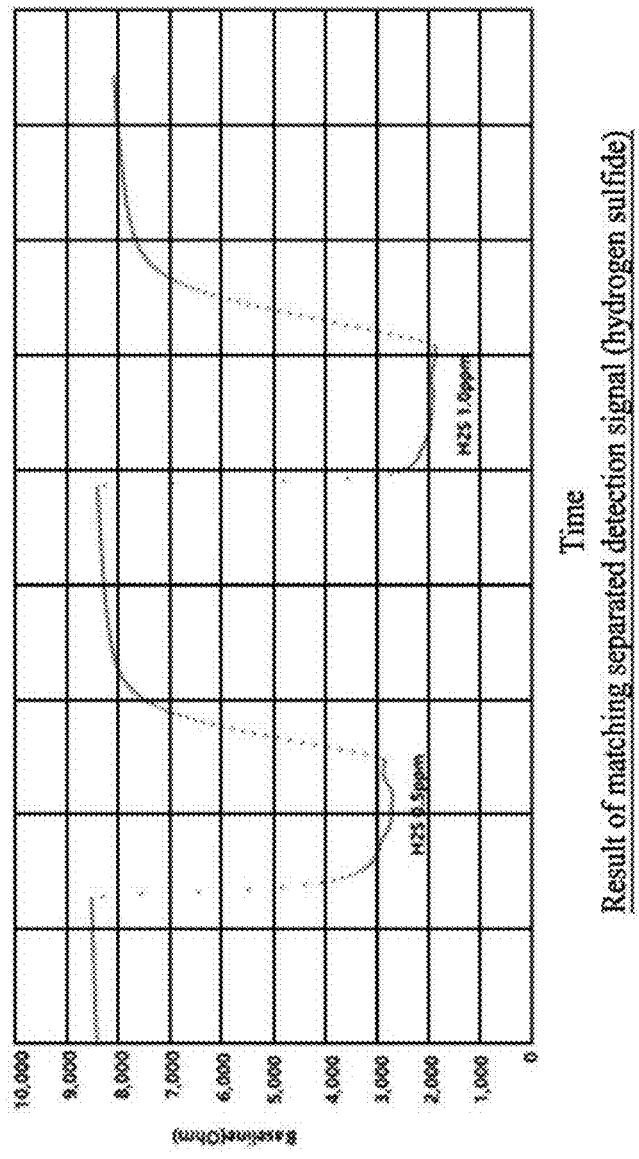

METHOD AND DEVICE FOR SPLITTING COMPOSITE SIGNAL RECEIVED FROM MULTI-COMPOSITE SENSOR

CROSS-REFERENCE TO RELATED APPLICATION

This application claims priority to and the benefit of Korean Patent Application No. 10-2020-0138958 filed on Oct. 26, 2020, the disclosure of which is incorporated herein by reference in its entirety.

BACKGROUND

1. Field of the Invention

The present invention relates to a method and a device for splitting a composite signal received from a multi-composite sensor, and more particularly, to a method and a device for splitting a composite signal received from a multi-composite sensor in which a composite signal, in which various detection signals for a temperature, humidity, gas leakage, fire, smoke, and an organic gas are mixed and integrated into one signal, is split into each individual detection signal and recognized.

2. Discussion of Related Art

With the recent rapid development of Internet of things (IoT) technology and sensor technology, various sensors are being developed to detect a temperature, humidity, gas leakage, occurrence of a harmful gas, occurrence of fire, and smoke. Monitoring systems, which monitor results detected through the sensors in real time to monitor occurrence of an abnormality sign in a place in which each sensor is installed, have been developed and commercialized.

Such sensors are provided as various types according to a target to be detected such as a temperature, humidity, or a harmful gas, or according to a use purpose such as detection of occurrence of fire, gas leakage, or occurrence of a harmful gas and are installed in various places. Thus, detection signals detected by corresponding sensors are provided in a central monitoring system, thereby performing monitoring.

Such sensors are classified into electrochemical sensors, catalytic sensors, photoionization sensors, and semiconductor sensors according to sensing methods. In recent years, semiconductor sensors having advantages of ease of manufacturing, economic feasibility, and durability have been mainly used.

However, since conventional sensors are individually installed according to a target to be detected or a use purpose, installing a plurality of sensors is expensive, and wiring for supplying a current for operations of the sensors or transmitting and receiving a detection signal output from each of the sensors becomes very complicated.

In order to solve such problems, recently, composite sensor modules constructed by integrating a plurality of sensors into one module have been developed and commercialized.

However, in conventional general composite sensor modules, a plurality of signal output terminals for individually outputting all detection signals output from the sensors are independently provided for the sensors. Thus, since interference between the detection signals output from the plurality of sensors is increased, accurate monitoring is not possible, and there is a limitation in that the size and complexity of the composite sensor module are rapidly increased due to an increase in the number of the signal output terminals.

Therefore, in the composite sensor module, if the detection signals of the sensors could be integrated to generate one composite signal and the generated composite signal could be output through one signal output terminal and provided to the monitoring system, it would be possible to prevent interference between the detection signals output from the plurality of sensors constituting the composite sensor module and to considerably reduce the size and complexity of the composite sensor module.

In this case, when the composite sensor module is configured to generate and output the composite signal, since the plurality of detection signals output from the plurality of sensors are integrated in the composite signal, there is an inevitable need for a technology for separating the detection signals from the composite signal.

Accordingly, the present invention is directed to providing a method in which a plurality of detection sensors for detecting a temperature, humidity, gas leakage, fire, smoke, and a harmful gas are integrated into one device to constitute a multi-composite sensor, detection signals output from the detection sensors are mixed to generate and transmit one composite signal through one signal output terminal, and each of the detection signals is separated from the received composite signal according to a characteristic of the detection signal output from each detection sensor, thereby conveniently and efficiently performing real-time monitoring on a place in which the multi-composite sensor is installed.

Next, related arts to which the present invention pertains will be described briefly, and afterwards, the technical object of the present invention that is different from the related arts will be described.

First, Korean Patent Publication No. 2019-0003597 (Jan. 9, 2019) relates to a sensor and a system for monitoring, and more particularly, to a sensor and a system for monitoring in which sensors for detecting the presence, position, movement, and posture of an object are configured to measure the presence, position, movement, and posture in measurements ranges disposed at different levels, thereby monitoring a condition or situation of an aged person.

That is, in the related art, the condition or situation of the aged person is monitored by installing the plurality of sensors for detecting the presence, position, movement, and posture of the object on a ceiling, a floor, and a wall. The related art does not disclose a method provided by the present invention, in which a plurality of detection sensors are integrated to constitute one multi-composite sensor, and detection signals output from the detection sensors are mixed to generate and transmit one composite signal, neither does it disclose a method in which a composite signal received from the multi-composite sensor is simply split into each detection signal included in the composite signal according to a characteristic of each detection signal, thereby efficiently recognizing occurrence of an abnormality sign in a place in which the multi-composite sensor is installed. Thus, the related art is considerably different from the present invention.

In addition, Korean Patent Registration No. 1202614 (Nov. 13, 2012) relates to a smart sensor module for monitoring an environment, and more particularly, to a smart sensor module for monitoring an environment, in which environment monitoring sensor data related to oxygen survey data, motion survey data, pressure survey data, humidity survey data, and flow rate survey data is provided to a remote data management server through a smart sensor module for monitoring an environment which includes an oxygen sensor, a 3-axis gyro sensor, a pressure sensor, a humidity sensor, a temperature sensor, a flow rate sensor, and a smart sensor module.

That is, in the related art, survey data measured through the smart sensor module is provided to the remote data management server through wired or wireless communication, and the related art does not disclose any technical features of how to provide the survey data.

On the other hand, in the present invention, a composite signal obtained by mixing detection signals of detection sensors is received from a multi-composite sensor implemented by integrating a plurality of detection sensors, and the detection signal for each detection sensor included in the composite signal is efficiently separated according to a characteristic of the detection signal for each detection sensor, thereby quickly recognizing an abnormality sign in a place in which the multi-composite sensor is installed. The related arts do not disclose, suggest, or imply any technical features of the present invention.

SUMMARY OF THE INVENTION

The present invention is directed to providing to a method and a device for splitting a composite signal received from a multi-composite sensor in which a composite signal obtained by mixing detection signals output from detection sensors is received from a multi-composite sensor implemented by integrating the plurality of detection sensors which are for detecting a temperature, humidity, gas leakage, fire, smoke, and an organic gas, into one device, thereby accurately separating each of the detection signals included in the received composite signal according to a signal characteristic of the detection signal for each detection sensor.

In this case, the multi-composite sensor is configured to generate one composite signal by mixing the detection sensors output from the detection sensors and output the generated composite signal through one signal output terminal to provide the output composite signal to the device.

The present invention is also directed to providing a method and a device in which each of detection signals is repeatedly extracted from a received composite signal according to a signal characteristic representing the detection signal of each individual detection sensor through a principal component analysis (PCA), thereby accurately separating each of the plurality of detection signals included in the composite signal.

The present invention is also directed to providing to a method and a device in which a received composite signal is multiplied by a previously generated matrix representing a characteristic of a detection signal for each detection sensor through a multi-linear regression (MLR), thereby accurately separating each detection signal included in the received composite signal.

The present invention is also directed to providing to a method and a device in which, with reference to a mapping table in which a signal value of each detection signal and a specific detection result according to the signal value are mapped to each other, the separated detection signal is output by matching the detection result according to the signal value of the separated detection signal with the specific detection result, and occurrence of an abnormality sign in a place in which a multi-composite sensor is installed is recognized according to the detection result matching the output separated detection signal to provide the occurrence of the abnormality sign to a user or a manager.

According to an aspect of the present invention, there is provided a method of splitting a composite signal received from a multi-composite sensor, the method including a composite signal receiving operation of receiving a composite signal from a multi-composite sensor, a composite signal splitting operation of separating each of a plurality of detection signals included in the received composite signal, and a measuring operation of matching each of the separated detection signals with a specific detection result to output each of the detection signals.

The composite signal splitting operation may include repeatedly extracting signals, which are main components, by applying a principal component analysis (PCA) to the received composite signal, and classifying each of the extracted signals according to a pre-stored frequency characteristic of each detection signal to separate each of the plurality of detection signals included in the received composite signal.

The composite signal splitting operation may include separating a frequency characteristic of each detection signal from the received composite signal according to a pre-stored frequency characteristic of each detection signal to separate each of the plurality of detection signals included in the received composite signal.

The composite signal splitting operation may include generating a matrix representing frequency characteristics of individual detection signals by applying a multi-linear regression (MLR) to the individual detection signals previously measured through the multi-composite sensor and the composite signal obtained by mixing the individual detection signals, and multiplying the received composite signal by the generated matrix to separate each of the plurality of detection signals included in the received composite signal.

The method may further include an abnormality sign recognizing operation of, when the specific detection result with which each of the separated detection signals is matched exceeds a preset critical value, recognizing that an abnormality sign occurs in a place in which the multi-composite sensor is installed, and a recognition result providing operation of providing a recognized result to a manager, a user, or a combination thereof, wherein the matching of each of the separated detection signals with the specific detection result to output each of the detection signals is performed by selecting the specific detection result with respect to a signal value of the separated detection signal with reference to a mapping table in which the signal value of the detection signal and the specific detection result according to the signal value are mapped to each other.

According to an aspect of the present invention, there is provided a device for splitting a composite signal received from a multi-composite sensor, the device including a composite signal reception unit configured to receive a composite signal from a multi-composite sensor, a composite signal splitting unit configured to separate each of a plurality of detection signals included in the received composite signal, and a measurement unit configured to match each of the separated detection signals with a specific detection result to output each of the separated detection signals.

The composite signal splitting unit may repeatedly extract signals, which are main components, by applying a PCA to the received composite signal and may classify each of the extracted signals according to a stored frequency characteristic of each detection signal to separate each of the plurality of detection signals included in the received composite signal.

The composite signal splitting unit may separate a frequency characteristic of each detection signal from the received composite signal according to a pre-stored frequency characteristic of each of the detection signals to separate each of the plurality of detection signals included in the received composite signal.

The composite signal splitting unit may generate a matrix representing frequency characteristics of individual detection signals by applying an MLR to the individual detection signals previously measured through the multi-composite sensor and the composite signal obtained by mixing the individual detection signals and may multiply the received composite signal by the generated matrix to separate each of the plurality of detection signals included in the received composite signal.

The device may further include an abnormality sign recognition unit configured to recognize that an abnormality sign occurs in a place in which the multi-composite sensor is installed when the specific detection result with which each of the separated detection signals is matched exceeds a preset critical value, and a recognition result providing unit configured to provide a recognized result to a manager, a user, or a combination thereof.

BRIEF DESCRIPTION OF THE DRAWINGS

FIG. 8C is a view showing a result of matching a detection signal for hydrogen sulfide with a specific detection result to output the detection signal according to one embodiment of the present invention.

DETAILED DESCRIPTION OF EXEMPLARY EMBODIMENTS

Figure 1:
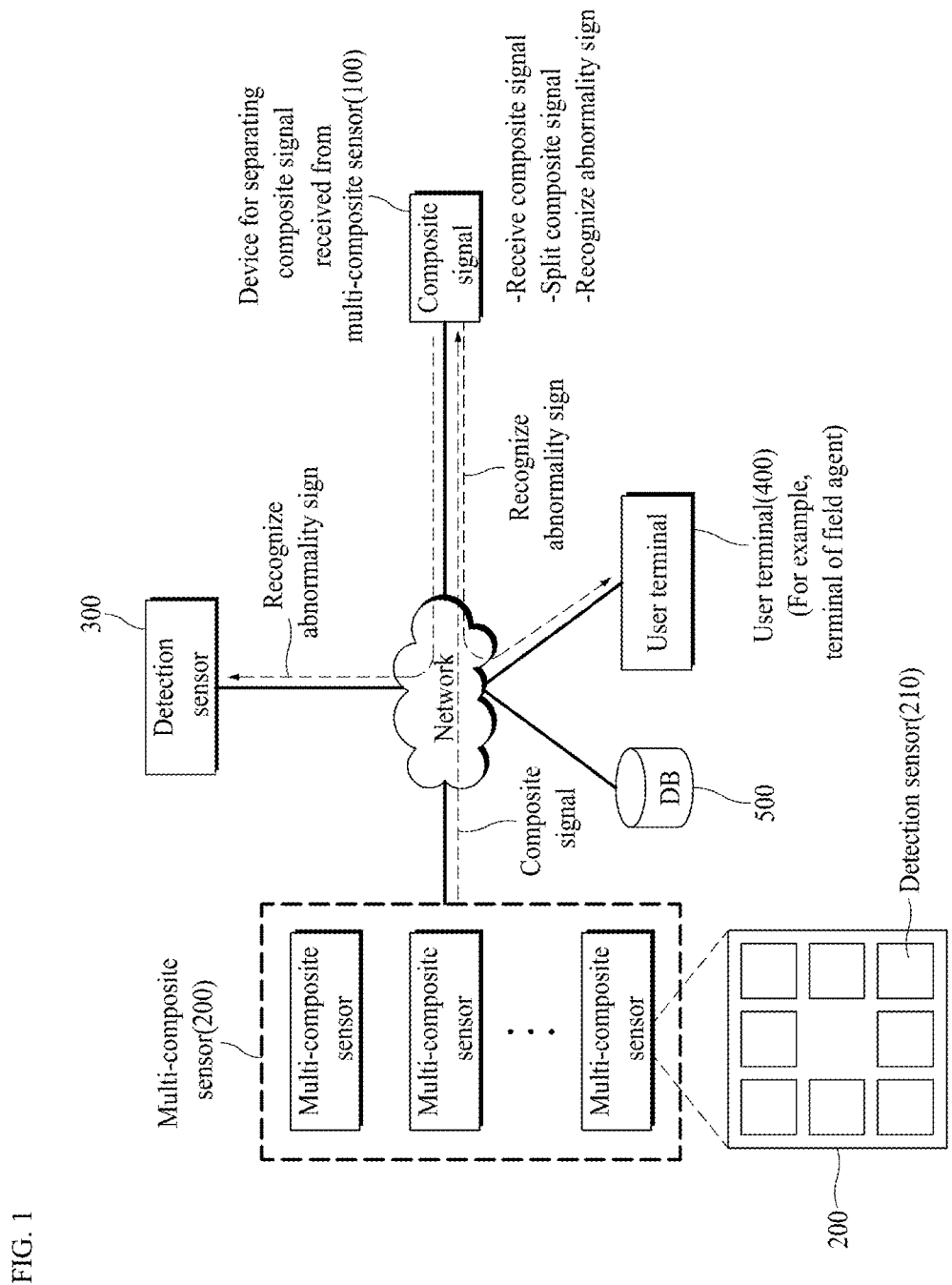
FIG. 1 is a conceptual diagram for describing a method and a device for splitting a composite signal received from a multi-composite sensor according to one embodiment of the present invention.

Hereinafter, exemplary embodiments of a method and a device for splitting a composite signal received from a multi-composite sensor of the present invention will be described in detail with reference to the accompanying drawings. Like reference numerals in the drawings refer to the like elements. In addition, regarding the embodiments of the present invention in this text, particular structural and functional descriptions are merely examples for the purpose of describing the embodiments of the present invention, and unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In the present invention, data may be interpreted as digital information.

FIG. 1 is a conceptual diagram for describing a method and a device for splitting a composite signal received from a multi-composite sensor according to one embodiment of the present invention.

As shown in FIG. 1, a device 100 for splitting a composite signal received from a multi-composite sensor according to one embodiment of the present invention (hereinafter referred to as a composite signal splitting device) receives a composite signal from each of a plurality of multi-composite sensors 200 installed in various places, separates each detection signal included in the received composite signal, and performs a function of recognizing occurrence of an abnormality sign in the place in which the multi-composite sensor 200 is installed based on each of the separated detection signals.

In addition, the multi-composite sensor 200 is implemented by integrating a plurality of detection sensors such as a temperature sensor, a humidity sensor, a gas leakage detection sensor, one or more organic gas detection sensors, a fire detection sensor, and a smoke detection sensor into one device, wherein the one or more organic gas detection sensors are for detecting organic gases that are harmful to the human body, such as carbon dioxide, carbon monoxide, ammonia, hydrogen sulfide, formaldehyde, and methane.

That is, the multi-composite sensor 200 is formed by mounting each of the plurality of detection sensors manufactured as a semiconductor type on one substrate based on a microelectromechanical system (MEMS).

In addition, the multi-composite sensor 200 includes one current input terminal 220 for supplying a current required for operations of a plurality of detection sensors 210 and one signal output terminal 250 for outputting a detection signal (resistance or voltage signal) output from each of the detection sensors 210 and providing the output detection signal to the composite signal splitting device 100.

In this case, in order to output the detection signals through the one signal output terminal 250, the multi-composite sensor 200 mixes the detection signals output from the detection sensors 210 to generate one composite signal and outputs the generated composite signal through the signal output terminal 250 to provide the composite signal to the composite signal splitting device 100.

That is, although a current input terminal and a signal output terminal are not provided for each detection sensor 210 and the multi-composite sensor 200 is a device into which the plurality of detection sensors 210 are integrated, the multi-composite sensor 200 is configured to receive a current through the common current input terminal 220 and concurrently output and provide a composite signal through the common signal output terminal 250. Thus, the structure of the multi-composite sensor 200 can be simplified, and the size and manufacturing cost thereof can be significantly reduced. Meanwhile, the configuration of the multi-composite sensor 200 will be described in detail with reference to FIG. 2.

In addition, the composite signal splitting device 100 splits the composite signal received from the multi-composite sensor 200 into the detection signal for each detection sensor 210.

In this case, the composite signal splitting device 100 separates the detection signal for each detection sensor 210 included in the received composite signal using a frequency characteristic which is a signal characteristic of each detection signal for each detection sensor 210.

The separating of the detection signal is performed by separating each detection signal included in the composite signal using a principal component analysis (PCA), separating each of the detection signals from the composite signal according to a pre-stored frequency characteristic of the detection signal for each detection sensor 210, or separating each of the detection signals from the composite signal using a matrix representing a frequency characteristic of the detection signal for each detection sensor 210 which is previously generated using a multi-linear regression (MLR). Here, the detection signals with respect to the detection sensors 210 have frequency characteristics which are different signal characteristics, and the separating of the detection signal using the frequency characteristic will be described in detail with reference to FIGS. 3 to 7.

In addition, the composite signal splitting device 100 measures detection strength for each detection signal according to the separated detection signal for each detection sensor 210 or matches the separated detection signal with a specific detection result to output the separated detection signal, thereby performing a function of recognizing occurrence of an abnormality sign in the place in which the multi-composite sensor 200 is installed and providing a recognized result to a manager terminal 300, a user terminal 400, or a combination thereof.

In this case, the manager terminal 300 is a communication terminal possessed by a manager who manages the composite signal splitting device 100, and the user terminal 400 is a communication terminal possessed by a field agent including a firefighter, a paramedic, a security guard, or the like, or a general person who is positioned in the place in which the multi-composite sensor 200 is installed. That is, the composite signal splitting device 100 provides the recognized result to the manager terminal 300 or the user terminal 400 to allow an abnormality sign to be quickly dealt with in a corresponding place and allow an evacuation from the corresponding place to be quickly performed.

In addition, the measuring of the detection strength is performed by calculating an amplitude of the separated detection signal and detecting a degree of the amplitude.

For example, when the separated detection signal is a gas leakage signal which is a detection signal detected through a gas leakage detection sensor, an amplitude of the separated detection signal, which is the gas leakage signal, is measured, and whether the measured amplitude is included in a critical range for each step is determined according to at least one critical range for each step (for example, a safe level or a dangerous level) of a degree of gas leakage to measure detection strength for the gas leakage.

In addition, the matching of each separated detection signal with the specific detection result to output the separated detection signal is performed by storing a mapping table, in which a signal value of each of the detection signals and the specific detection result according to the signal value of the detection signal are mapped to each other, and selecting the specific detection result mapped to the signal value of each of the separated detection signals.

For example, when the separated detection signal is a harmful gas detection signal obtained by detecting a specific harmful gas, the composite signal splitting device 100 matches and outputs a concentration mapped to a detection signal value of the harmful gas detection signal according to a mapping table in which the detection signal value of the harmful gas detection signal and the concentration (ppm) are mapped to each other.

In addition, a database 500 shown in FIG. 1 includes the received composite signal, the separated detection signal for each detection sensor 210, the recognized recognition result, the frequency characteristic of each detection signal, and the matrix representing the frequency characteristic of each detection signal and performs a function of splitting the composite signal into each detection signal, a function of storing a program for recognizing the abnormality sign, or the like.

Figure 2:
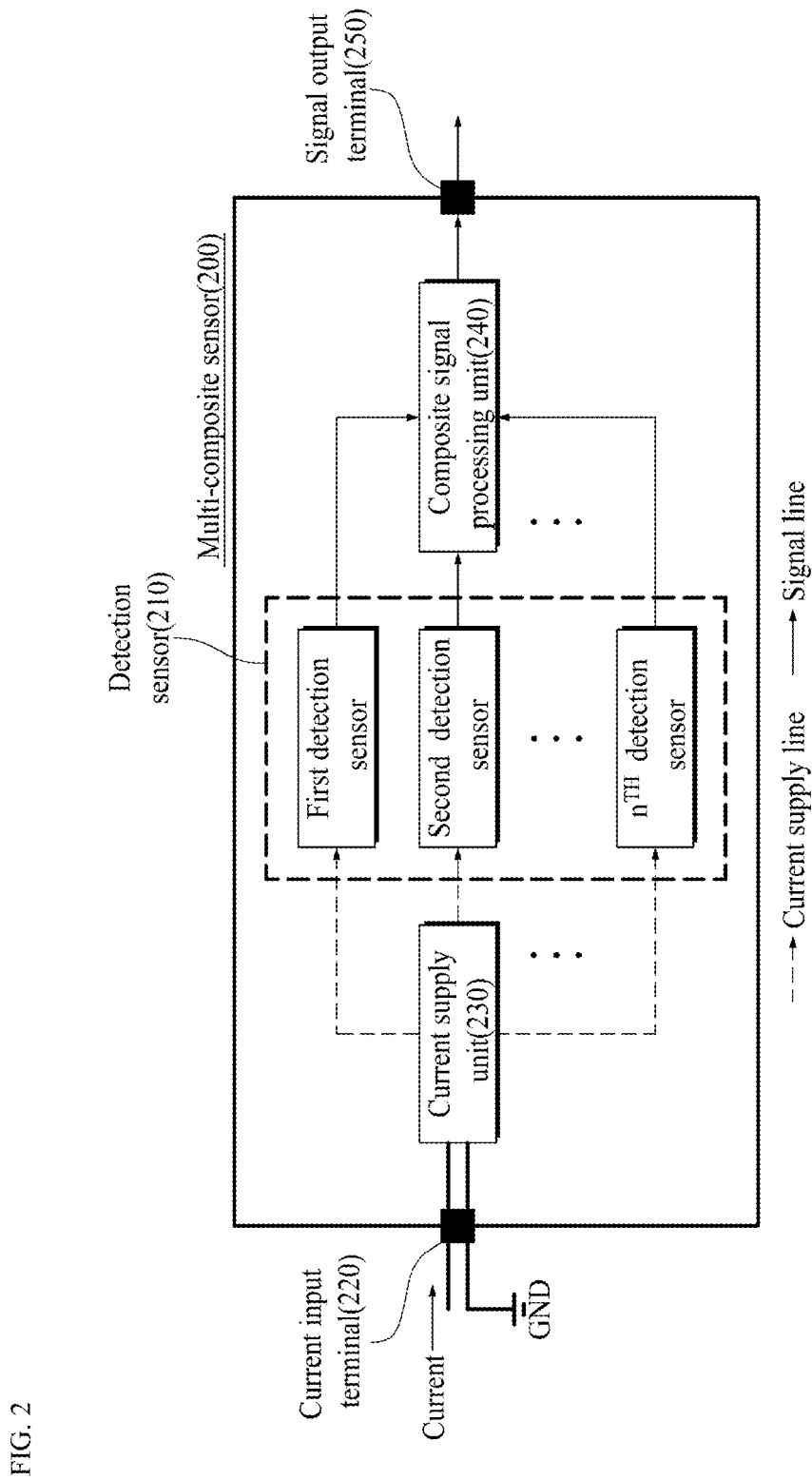
FIG. 2 is a block diagram illustrating a configuration of a multi-composite sensor which provides a composite signal to a device for splitting a composite signal according to one embodiment of the present invention.

FIG. 2 is a block diagram illustrating a configuration of a multi-composite sensor which provides a composite signal to a device for splitting a composite signal according to one embodiment of the present invention.

As shown in FIG. 2, a multi-composite sensor 200 according to one embodiment of the present invention includes a plurality of detection sensors 210, a current input terminal 220 which receives a current required for operations of the plurality of detection sensors 210 from an external power source and supplies the received current, a current supply unit 230 which supplies a current input from the current input terminal 220 to the plurality of detection sensors 210, and a composite signal processing unit 240 which generates a composite signal by mixing detection signals output from the plurality of detection sensors 210 and outputs the composite signal through a signal output terminal 250 to provide a composite signal splitting device 100.

One current input terminal 220 and one signal output terminal 250 are provided as described above.

In addition, the current supply unit 230 converts the current received through the current input terminal 220 into a direct current (DC) required for the operation of each detection sensor 210 and supplies the DC to each of the detection sensors 210. Furthermore, the current supply unit 230 supplies the converted DC to each detection sensor 210 through current supply lines, each of which is connected to one of the detection sensors 210.

Meanwhile, the current supply unit 230 may be connected to a ground (GND) terminal through the current input terminal 220 and may be configured to measure a common mode current through the GND terminal, remove noise included in the input current by subtracting the measured common mode current from a current included in the input current before the input current is converted into the DC, and convert the input current into the DC to supply the converted DC, thereby preventing an overcurrent from being supplied to the detection sensor 210 due to the common mode current and concurrently preventing the detection signal output from each of the detection sensors 210 from being affected by the noise.

In addition, the detection sensors 210 are provided in many different types such as a temperature detection sensor for detecting a temperature in a corresponding place, a humidity detection sensor for detecting humidity, a fire detection sensor for detecting occurrence of fire, a gas leakage detection sensor for detecting gas leakage, a harmful gas detection sensor for detecting occurrence of a harmful gas, and a smoke detection sensor for detecting occurrence of smoke and are integrated into one device in a chip-on-board type to constitute the multi-composite sensor 200.

Furthermore, the composite signal processing unit 240 performs a function of generating one composite signal by mixing the detection signals output from the detection sensors 210 and outputting the generated composite signal through the signal output terminal 250.

That is, the composite signal processing unit 240 adds all the detection signals output from the detection sensors 210 and mixes the detection signals of the detection sensors 210 to generate and output the composite signal.

Since the composite signal processing unit 240 for generating and outputting the composite signal in this way includes one signal output terminal 250 in order to reduce a magnitude of the complexity and the manufacturing cost of the multi-composite sensor 200, the composite signal processing unit 240 is a component that should be essentially provided. In this case, the detection signals output from the detection sensors 210 have frequency characteristics which are different signal characteristics as described above.

Figure 3:
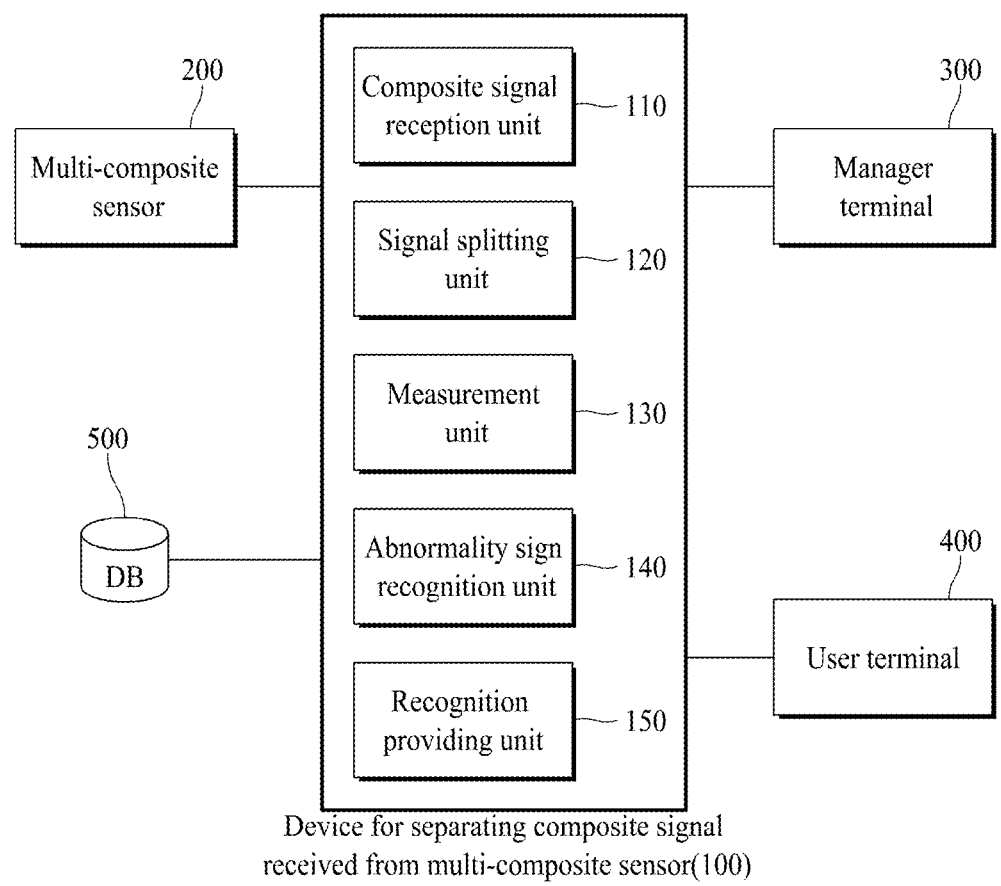
FIG. 3 is a block diagram illustrating a configuration of a device for splitting a composite signal received from a multi-composite sensor according to one embodiment of the present invention.
Figure 4:
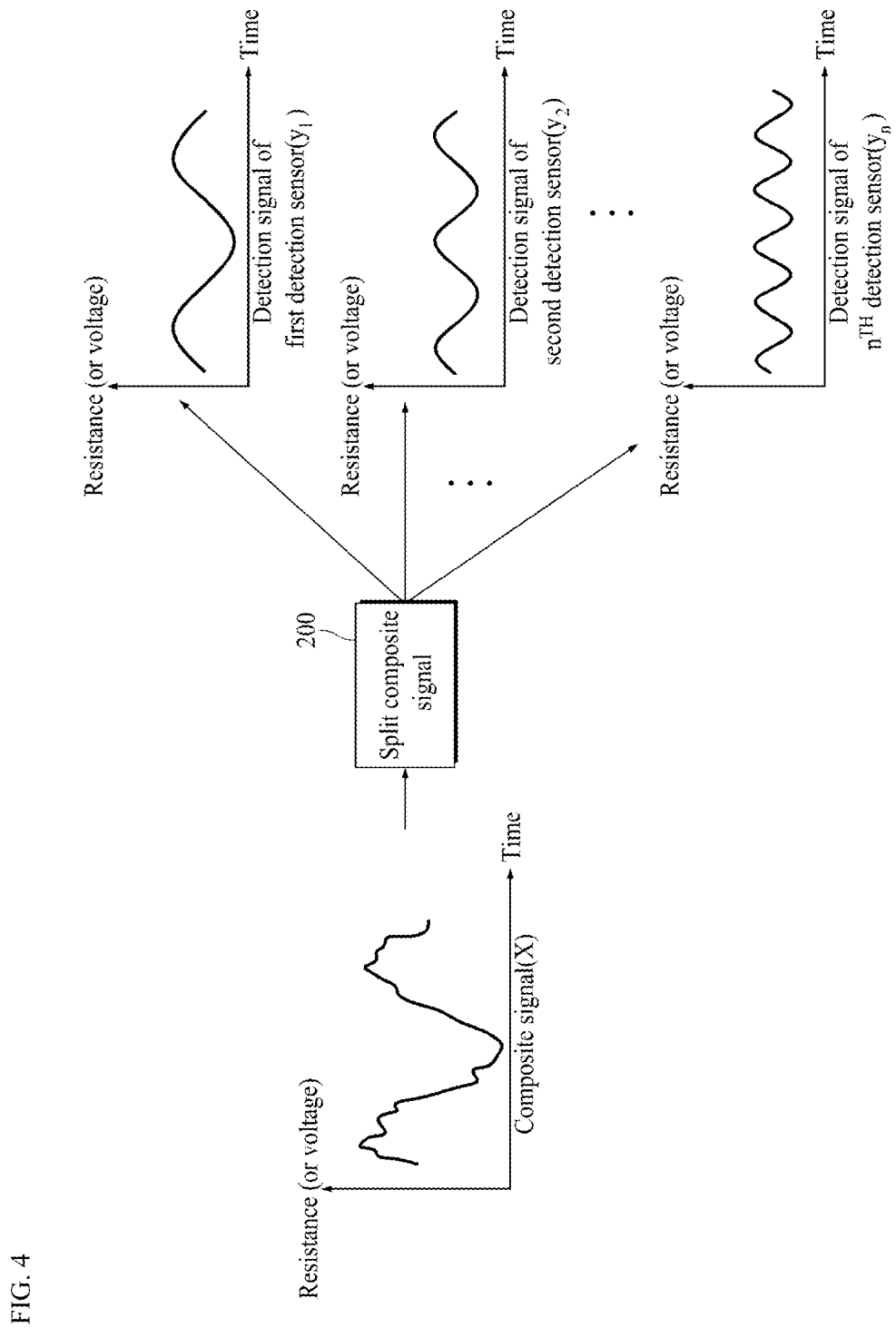
FIG. 4 shows views illustrating a process of splitting a composite signal according to one embodiment of the present invention.

FIG. 3 is a block diagram illustrating a configuration of a device for splitting a composite signal received from a multi-composite sensor according to one embodiment of the present invention, and FIG. 4 shows views illustrating a process of splitting a composite signal according to one embodiment of the present invention.

As shown in FIG. 3, a composite signal splitting device 100 according to one embodiment of the present invention includes a composite signal reception unit 110 which receives a composite signal from a multi-composite sensor 200, a composite signal splitting unit 120 which separates each detection signal included in the received composite signal, a measurement unit 130 which matches each of the separated detection signals with a specific detection result to output the detection signal, an abnormality sign recognition unit 140 which recognizes occurrence of an abnormality sign based on the specific detection result with respect to the matched and output detection signal, and a recognition result providing unit 150 which provides a recognized recognition result.

The composite signal reception unit 110 performs a function of receiving the composite signal generated by the multi-composite sensor 200 installed in any of various places.

In addition, the composite signal splitting unit 120 performs a function of separating each detection signal from the composite signal received from the multi-composite sensor 200.

As shown in FIG. 4, in the process of splitting the composite signal according to one embodiment of the present invention, when a composite signal X is received through the composite signal reception unit 110, the composite signal splitting unit 120 separates a detection signal for each detection sensor 210 included in the composite signal. Here, each of the separated detection signals is denoted as $y_n$ in FIG. 4.

In this case, the composite signal splitting unit 120 separates each detection signal included in the composite signal using a frequency characteristic that is a signal characteristic of each of the detection signals.

That is, the composite signal splitting unit 120 separates each detection signal included in the composite signal using a PCA, separates each detection signal included in the composite signal using a pre-stored frequency characteristic of the detection signal for each detection sensor 210, or separates each detection signal included in the composite signal using a matrix representing the frequency characteristic of the detection signal for each detection sensor 210 which is previously generated through an MLR.

The above-listed separations of each detection signal included in the composite signal will be described in detail with reference to FIGS. 5, 6, and 7.

In addition, the measurement unit 130 performs a function of matching the separated detection signal with the specific detection result to output the detection signal (see FIGS. 8A to 8C) or a function of calculating an amplitude of the separated detection signal and measuring a detection strength for each detection signal to output the measured detection strength.

Meanwhile, since the matching, outputting, and measuring of the detection strength have been described with reference to FIG. 1, further detailed description thereof will be omitted.

In addition, the abnormality sign recognition unit 140 performs a function of recognizing occurrence of an abnormality sign in a place in which the multi-composite sensor 200 is installed based on the specific detection result with which the separated detection signal is matched, or the measured detection strength.

When the separated detection signal is matched with the specific detection result and output, and when the matched detection result exceeds a preset critical value, the abnormality sign recognition unit 140 recognizes that an abnormality sign occurs. When the detection strength for the separated detection signal is measured and output, and when the detection strength exceeds a preset critical value, the abnormality sign recognition unit 140 recognizes that an abnormality sign occurs.

In addition, the recognition result providing unit 150 performs a function of providing a recognized recognition result to a manager terminal 300 possessed by a manager of the composite signal splitting device 100, a user terminal 400 possessed by a field agent positioned in a place in which the multi-composite sensor 200 is installed, or a combination thereof.

Hereinafter, a method of separating individual detection signals from a composite signal will be described with reference to FIGS. 5 to 7.

Figure 5:
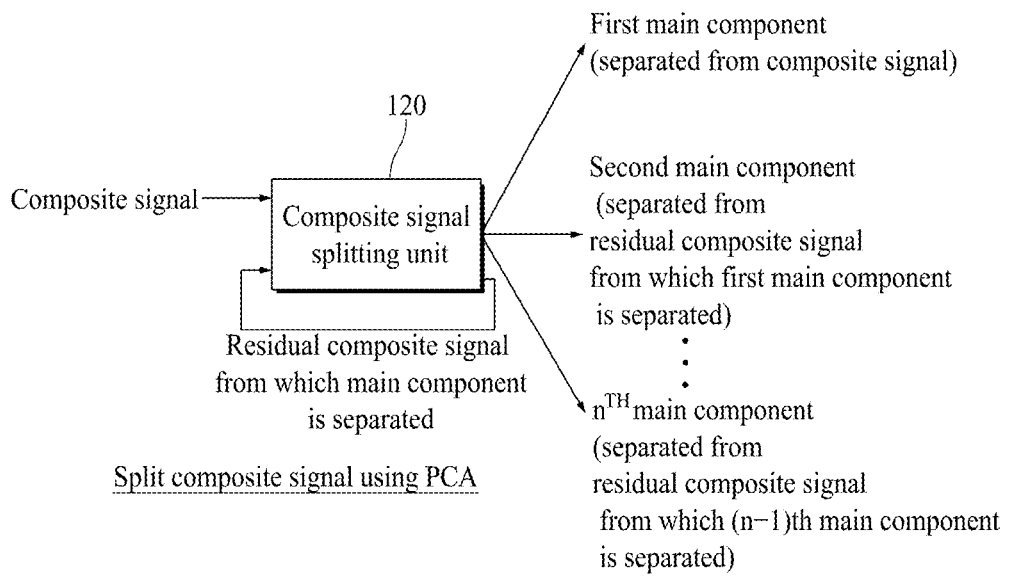
FIG. 5 is a diagram for describing a process of separating detection signals from a composite signal using a principal component analysis (PCA) according to one embodiment of the present invention.

FIG. 5 is a diagram for describing a process of separating detection signals from a composite signal using a PCA according to one embodiment of the present invention.

As shown in FIG. 5, when the detection signal for each detection sensor 210 is separated from the received composite signal using the PCA according to one embodiment of the present invention, a composite signal splitting unit 120 extracts a first main component from the received composite signal to separate the first main component from the received composite signal, thereby removing the first main component from the received composite signal.

In addition, the composite signal splitting unit 120 extracts a second main component from the residual composite signal, from which the first main component is removed, to separate the second main component from the residual composite signal from which the first main component is removed, thereby removing the second main component from the residual composite signal from which the first main component is removed.

Such processes are repeatedly performed to separate all main components from the received composite signal, and a result of separating the main components by repeatedly performing the processes is output by being matched with the detection signal for each detection sensor 210, thereby separating the detection signal for each detection sensor 210 included in the composite signal.

In this case, the matching and the outputting of the detection signal for each detection sensor 210 are performed by comparing a pre-stored frequency characteristic of each detection signal with a frequency characteristic of each of the extracted main components and classifying each of the extracted signals according to the stored frequency characteristic of each detection signal.

Figure 6:
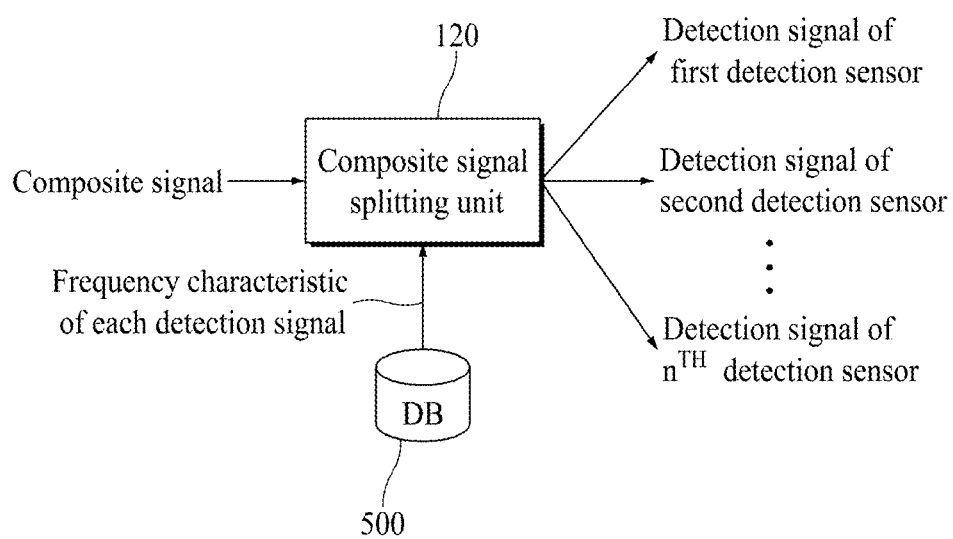
FIG. 6 is a diagram for describing a process of separating detection signals from a composite signal using frequency characteristics of the detection signals according to one embodiment of the present invention.

FIG. 6 is a diagram for describing a process of separating detection signals from a composite signal using frequency characteristics of the detection signals according to one embodiment of the present invention.

As shown in FIG. 6, when the detection signals are separated from the composite signal using the frequency characteristics of the detection signals according to one embodiment of the present invention, a composite signal splitting unit 120 loads a frequency characteristic of the detection signal for each detection sensor 210, which is pre-stored from the received composite signal, from a database 500.

In addition, the composite signal splitting unit 120 separates each individual frequency characteristic from the received composite signal according to the loaded frequency characteristic of each detection signal and extracts the detection signal for each detection sensor 210 from the composite signal, thereby separating the detection signal for each detection sensor 210 included in the received composite signal. That is, the composite signal splitting unit 120 filters the received composite signal according to the pre-stored frequency characteristic of the detection signal for each detection sensor 210 with the individual frequency characteristic, thereby quickly and efficiently separating the detection signal for each detection sensor 210 included in the composite signal.

Figure 7:
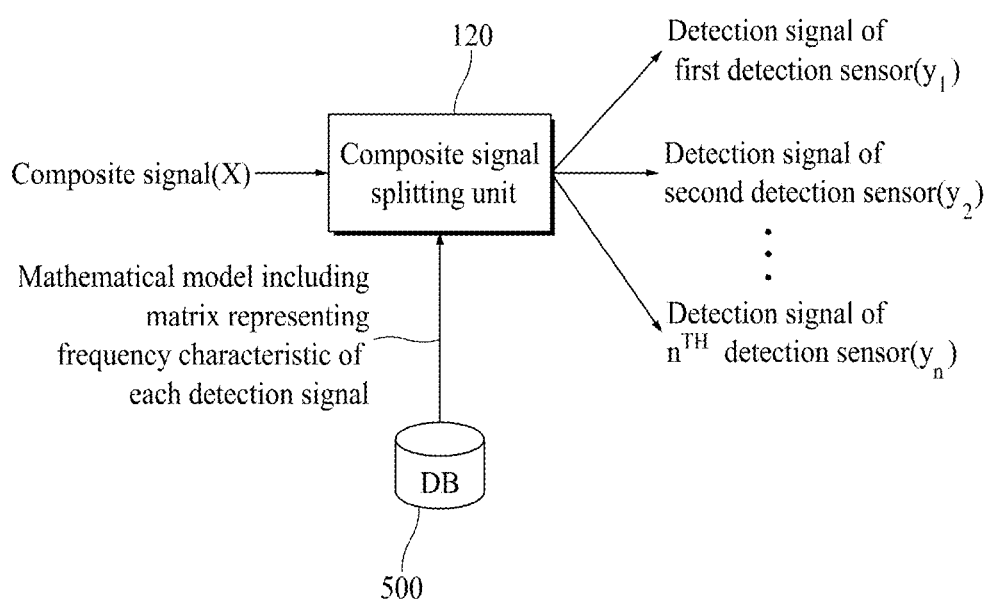
FIG. 7 is a diagram for describing a process of separating detection signals from a composite signal using a multi-linear regression (MLR) according to one embodiment of the present invention.

FIG. 7 is a diagram for describing a process of separating detection signals from a composite signal using an MLR according to one embodiment of the present invention.

As shown in FIG. 7, when the detection signal for each detection sensor 210 is separated from the received composite signal using the MLR according to one embodiment of the present invention, the composite signal splitting unit 120 separates each detection signal included in the received composite signal using a mathematical model including a matrix representing a frequency characteristic of the detection signal for each detection sensor 210 which is previously generated and stored.

The mathematical model defines a correlation between the composite signal and the detection signal to be separated by generating a matrix, which represents a frequency characteristic of each detection signal for separating the detection signal included in a mixture signal, using the MLR based on the detection signal for each detection sensor 210 previously measured through a multi-composite sensor 200 and the mixture signal obtained by mixing the detection signals. The mathematical model is represented by [Equation 1] below.

$$Y = AX + B \quad \text{[Equation 1]}$$

Here, X represents a 1×n matrix including a composite signal for each detection sensor 210, A represents an n×n matrix representing the generated frequency characteristic of each detection signal, and Y represents a 1×n matrix including the detection signal to be separated from the composite signal. In addition, B may be a constant value and may be a value for correcting an error for each detection signal to be separated from the composite signal.

In addition, when a composite signal X is received from the multi-composite sensor 200, the composite signal splitting unit 120 may multiply the composite signal X by the matrix representing the generated frequency characteristic of each detection signal according to [Equation 1], thereby separating each of the plurality of detection signals included in the composite signal.

That is, the composite signal splitting unit 120 generates a matrix representing a frequency characteristic of each detection signal by applying the MLR to a detection signal for each detection sensor 210 previously measured through the multi-composite sensor 200 and a composite signal obtained by mixing the detection signals and multiplies an actual composite signal received from the multi-composite sensor 200 by the generated matrix according to [Equation 1], thereby separating the detection signal for each detection sensor 210 included in the received composite signal.

Meanwhile, of course, the matrix representing the frequency characteristic of each detection signal can be generated through various linear regression (LR) analysis methods such as a single linear regression (SLR) method instead of the MLR.

Figure 8A:
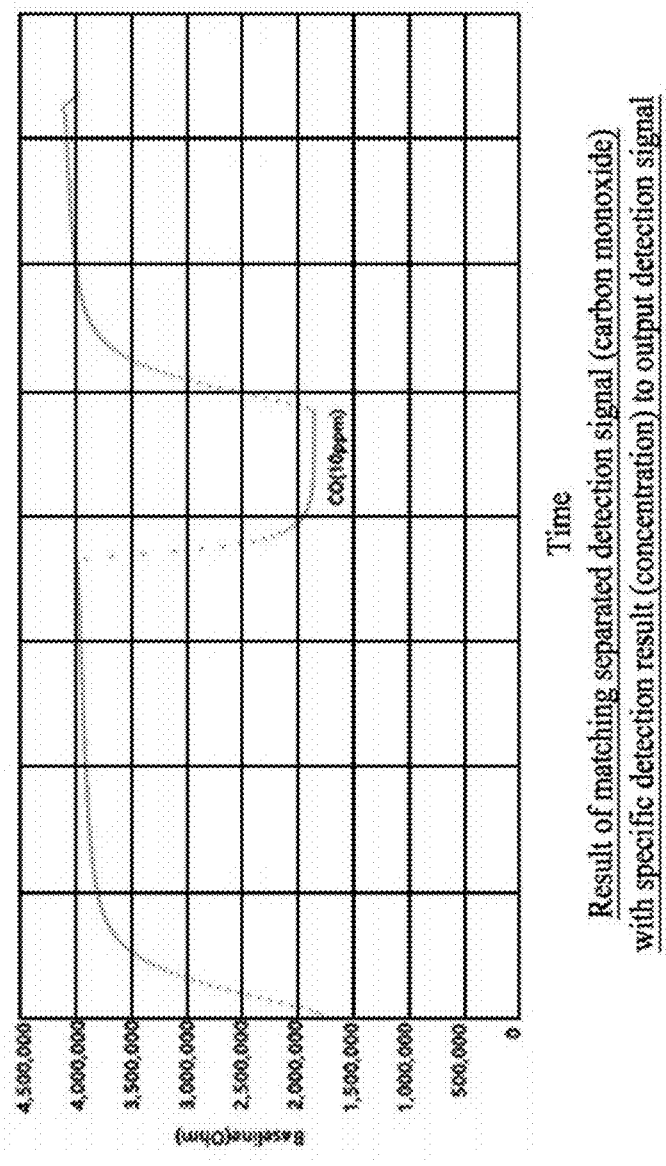
FIG. 8A is a view showing a result of matching a detection signal for carbon monoxide with a specific detection result to output the detection signal according to one embodiment of the present invention.
Figure 8B:
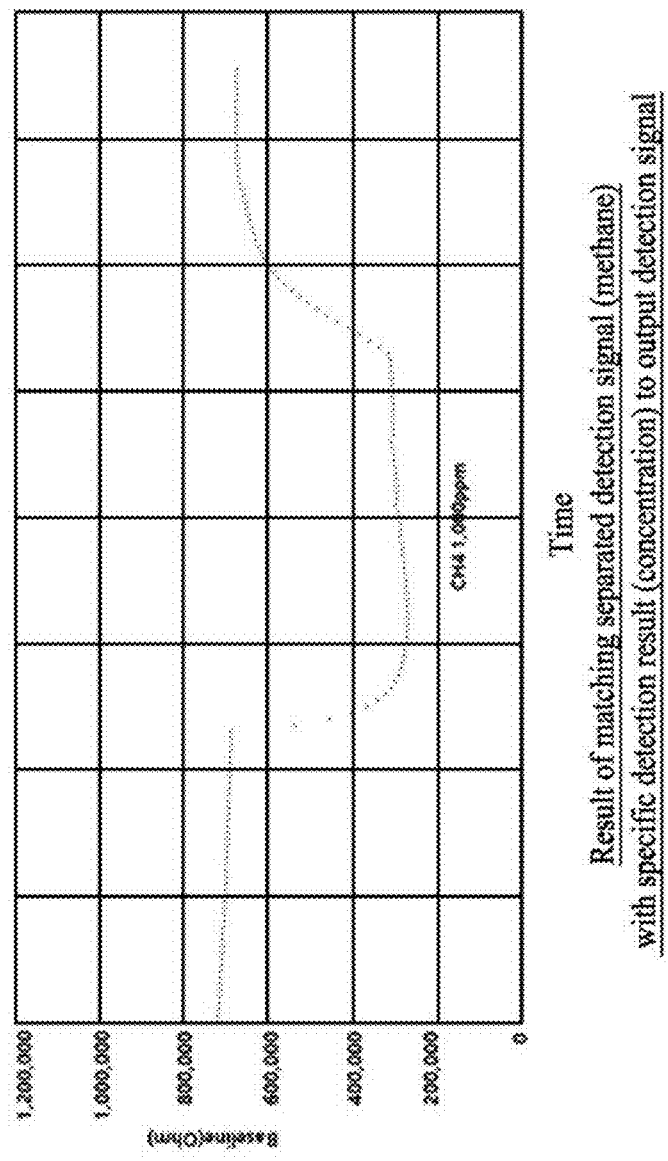
FIG. 8B is a view showing a result of matching a detection signal for methane with a specific detection result to output the detection signal according to one embodiment of the present invention.

FIG. 8A is a view showing a result of matching a detection signal for carbon monoxide with a specific detection result to output the detection signal according to one embodiment of the present invention, FIG. 8B is a view showing a result of matching a detection signal for methane with a specific detection result to output the detection signal according to one embodiment of the present invention, and FIG. 8C is a view showing a result of matching a detection signal for hydrogen sulfide with a specific detection result to output the detection signal according to one embodiment of the present invention.

As shown in FIGS. 8A to 8C, a measurement unit 130 matches each detection signal separated from a received composite signal with a specific detection result to output the matched detection signal. Since the matching and the outputting have been described with reference to FIGS. 1 and 3, further detailed description thereof will be omitted.

In addition, FIGS. 8A to 8C show the results of separating the detection signals obtained by detecting carbon monoxide, methane, and hydrogen sulfide from the received composite signals and matching the detection signals with the specific detection results, but the composite signal includes various detection signals for a temperature, humidity, and the like as well as detection signals for various organic gases other than carbon monoxide, methane, and hydrogen sulfide, such as nitrogen monoxide.

Figure 9:
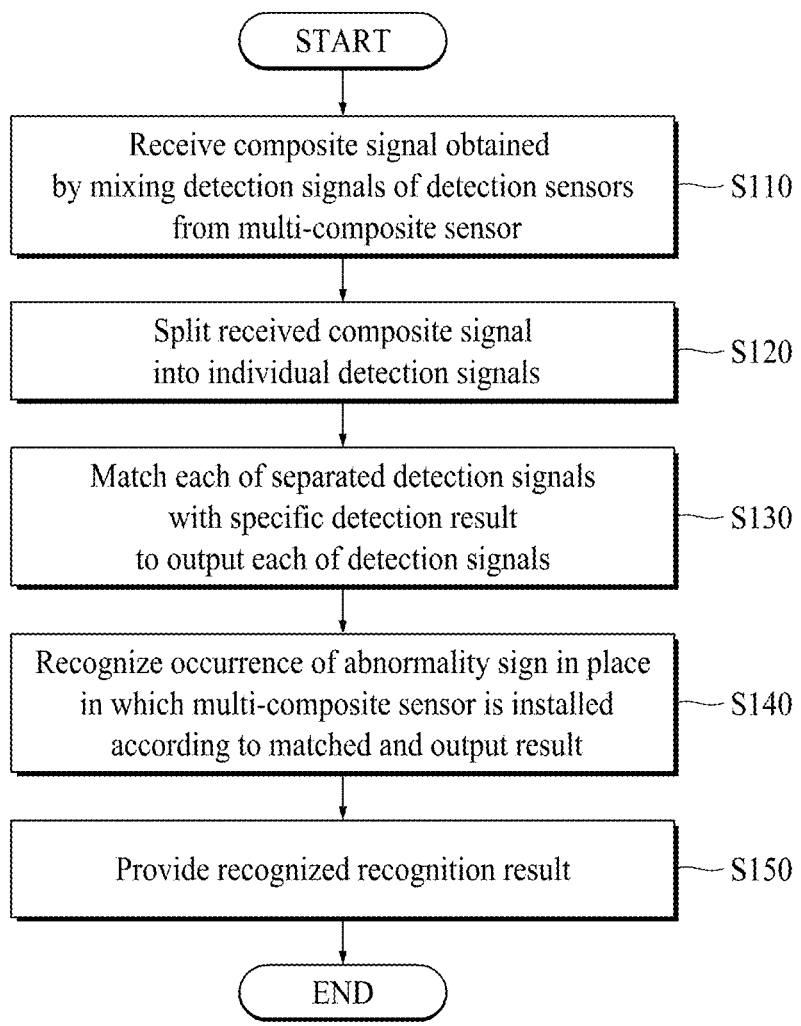
FIG. 9 is a flowchart illustrating a procedure of splitting a composite signal received from a multi-composite sensor according to one embodiment of the present invention.

FIG. 9 is a flowchart illustrating a procedure of splitting a composite signal received from a multi-composite sensor according to one embodiment of the present invention.

As shown in FIG. 9, in the procedure of separating the composite signal received from a multi-composite sensor 200 according to one embodiment of the present invention, first, a composite signal splitting device 100 performs a composite signal receiving operation of receiving the composite signal from the multi-composite sensor 200 (S110).

As described above, the composite signal is a signal in which the multi-composite sensor 200 mixes detection signals output from a plurality of detection sensors 210 provided in the multi-composite sensor 200.

Next, the composite signal splitting device 100 performs a composite signal splitting operation of extracting the detection signal for each detection sensor 210 from the received composite signal and splitting the received composite signal into each detection signal (S120).

The composite signal splitting operation is performed by repeatedly extracting each main component from the received composite signal using a PCR and separating each detection signal, separating a pre-stored frequency characteristic of the detection signal for each detection sensor 210 from the received composite signal, or multiplying the received composite signal by a matrix, which represents the frequency characteristic of the detection signal for each detection sensor 210 and is previously generated by applying an MLR, according to the mathematical model and separating an individual detection signal from the received composite signal.

Meanwhile, since the separating of each of the detection signals from the received composite signal has been described with reference to FIGS. 5 to 7, further detailed description thereof will be omitted.

Then, the composite signal splitting device 100 performs an output operation of matching each of the separated detection signals with a specific detection result to output each of the separated detection signals (S130).

As described above, the matching with the detection result and the outputting are performed by selecting the detection result according to a signal value of each separated detection signal with reference to a mapping table in which the signal value of each detection signal and the detection result for each signal value are mapped to each other. However, in the outputting operation, an amplitude of each of the separated detection signals may be measured to output detection strength.

Next, the composite signal splitting device 100 performs an abnormality sign recognizing operation of recognizing occurrence of an abnormality sign in a place in which the multi-composite sensor 200 is installed according to a result of matching each of the separated detection signals with the specific detection result to output each of the matched detection signals (S140).

In this case, in the abnormality sign recognizing operation, when the detection result with which the detection signal is matched exceeds a preset critical value, it is recognized that the abnormality sign occurs in the place in which the multi-composite sensor 200 is installed. However, it may be recognized that the abnormality sign occurs when detection strength is output and the detection strength exceeds a preset critical value.

For example, when the separated detection signal is a detection signal obtained by detecting carbon monoxide, and the detection result with which a signal value of the separated detection signal is matched is shown to exceed 100 ppm with reference to a mapping table in which a carbon monoxide concentration (unit: ppm), which is a detection result according to the signal value of the signal obtained by detecting carbon monoxide, is mapped, it is recognized that carbon monoxide is generated (an abnormality sign occurs) in a place in which the multi-composite sensor 200 is installed.

Subsequently, the composite signal splitting device 100 performs a recognition result providing operation of providing a recognized recognition result to a manager terminal 300, a user terminal 400 possessed by a user positioned in a corresponding place, or a combination thereof (S150).

That is, the composite signal splitting device 100 provides the recognized recognition result to allow a manager or a user to quickly deal with the occurrence of the abnormality sign.

As described above, the present invention relates to a method and a device for splitting a composite signal received from a multi-composite sensor. A composite signal obtained by mixing detection signals of detection sensors is received from a multi-composite sensor in which the plurality of detection sensors are implemented as one device, the detection signal for each detection sensor is efficiently separated from the received composite signal using a PCA, a pre-stored frequency characteristic for each detection sensor, or an MRL, thereby quickly recognizing occurrence of an abnormality sign in a place in which the multi-composite sensor is installed.

As described above, in a method and a device for splitting a composite signal received from a multi-composite sensor according to the present invention, a composite signal obtained by mixing detection signals output from detection sensors is received from a multi-composite sensor implemented by integrating the plurality of detection sensors into one device, and each detection signal included in the received composite signal is accurately classified and separated according to a signal characteristic of the detection signal for each detection sensor, thereby efficiently, accurately, and quickly recognizing occurrence of an abnormality sign in a place in which the multi-composite sensor is installed.

While the present invention has been described based on the exemplary embodiments thereof, it is to be understood that the present invention is not limited to the exemplary embodiments and each element of the present invention may be changed or modified within the technical scope of the present invention to achieve the same object and effect.

Moreover, while the present invention has been particularly shown and described with reference to the exemplary embodiments thereof, the present invention is not limited to the specific embodiments. It will be understood by those skilled in the art that various changes and modifications may be made by those skilled in the art without departing from the spirit and scope of the present invention as disclosed in the accompanying claims. These modifications should not be understood individually from the technical idea or viewpoint of the present invention.

DESCRIPTIONS OF REFERENCE NUMERALS

100: device for splitting composite signal received from multi-composite sensor
110: composite signal reception unit
120: composite signal splitting unit
130: measurement unit
140: abnormality sign recognition unit
150: recognition result providing unit
200: multi-composite sensor
300: manager terminal
400: user terminal
500: database

What is claimed is:

1. A method of splitting a composite signal received from a multi-composite sensor, the method comprising:
  detecting, by a plurality of detection sensors, detection signals of a temperature, humidity, gas leakage, fire, smoke, and a harmful gas;
  integrating the plurality of detection sensors to constitute the multi-composite sensor;

mixing, by the multi-composite sensor, the detection signals and generating a single composite signal;

transmitting, by a single output terminal of the multi-composite sensor, the single composite signal;

receiving, by a composite signal splitting device, the single composite signal;

separating, by the composite signal splitting device, each of the detection signals included in the received single composite signal; and matching, by the composite signal splitting device, each of the separated detection signals with a specific detection result to output each of the detection signals.

2. The method of claim 1, wherein the separating step includes:

applying a principal component analysis (PCA) to the received single composite signal and repeatedly extracting signals which are main components; and classifying each of the extracted signals according to a pre-stored frequency characteristic of each detection signal to separate each of the plurality of detection signals included in the received single composite signal.

3. The method of claim 1, wherein the separating step includes separating a frequency characteristic of each detection signal from the received single composite signal according to a pre-stored frequency characteristic of each detection signal to separate each of the detection signals included in the received single composite signal.

4. The method of claim 1, wherein the separating step includes:

applying a multi-linear regression (MLR) to individual detection signals previously measured through the multi-composite sensor and the single composite signal obtained by mixing the individual detection signals, and generating a matrix representing frequency characteristics of the individual detection signals; and multiplying the received single composite signal by the generated matrix to separate each of the detection signals included in the received single composite signal.

5. The method of claim 1, further comprising:

recognizing an abnormality sign occurs occurring in a place in which the multi-composite sensor is installed when the specific detection result with which each of the separated detection signals is matched exceeds a preset critical value; and providing a recognized result to a manager, a user, or a combination thereof, wherein the matching of each of the separated detection signals with the specific detection result to output each of the detection signals is performed by selecting the specific detection result with respect to a signal value of the separated detection signal with reference to a mapping table in which the signal value of the detection signal and the specific detection result according to the signal value are mapped to each other.

6. A device for splitting a composite signal received from a multi-composite sensor, the device having a processor in communication with one or more types of memory comprising:

a composite signal reception unit configured to receive a single composite signal from the multi-composite sensor, wherein the multi-composite sensor having a processor in communication with one or more types of memory comprises:

a plurality of detection sensors detecting detection signals of a temperature, humidity, gas leakage, fire, smoke, and a harmful gas;

a composite signal processing unit configured to mix the detection signals and generate the single composite signal; and a single output terminal configured to transmit the single composite signal;

a composite signal splitting unit configured to separate each of the detection signals included in the received single composite signal; and a measurement/match unit configured to measure detection strength for each of the detection signals according to the separated detection signal for each of the plurality of detection sensors or configured to match each of the separated detection signals with a specific detection result to output each of the separated detection signals.

7. The device of claim 6, wherein the composite signal splitting unit is configured to repeatedly extract signals, which are main components, by applying a principal component analysis (PCA) to the received single composite signal and classify each of the extracted signals according to a stored frequency characteristic of each detection signal to separate each of the detection signals included in the received single composite signal.

8. The device of claim 6, wherein the composite signal splitting unit is configured to separate a frequency characteristic of each detection signal from the received single composite signal according to a pre-stored frequency characteristic of each of the detection signals to separate each of the plurality of detection signals included in the received single composite signal.

9. The device of claim 6, wherein the composite signal splitting unit is configured to generate a matrix representing frequency characteristics of individual detection signals by applying a multi-linear regression (MLR) to the individual detection signals previously measured through the multi-composite sensor and the single composite signal obtained by mixing the individual detection signals and multiply the received single composite signal by the generated matrix to separate each of the detection signals included in the received single composite signal.

10. The device of claim 6, further comprising:

an abnormality sign recognition unit configured to recognize that an abnormality sign occurs in a place in which the multi-composite sensor is installed when the specific detection result with which each of the separated detection signals is matched exceeds a preset critical value; and a recognition result providing unit configured to provide a recognized result to a manager, a user, or a combination thereof, wherein the matching of each of the separated detection signals with the specific detection result to output each of the detection signals is performed by selecting the specific detection result with respect to a signal value of the separated detection signal with reference to a mapping table in which the signal value of the detection signal and the specific detection result according to the signal value are mapped to each other.

* * * * *